United States Patent [19]

Wirt et al.

[11] Patent Number: 5,063,680
[45] Date of Patent: Nov. 12, 1991

[54] SELF-ERECTING TILTMETER

[75] Inventors: Thomas M. Wirt, Irvine; Ludd A. Trozpek, Claremont; James W. Brosius, Mission Viejo; Randolph A. Johnson, Orange, all of Calif.; Hugh N. Baertlein, Jamestown, R.I.; Eric W. Newman, Placentia, Calif.

[73] Assignee: Rockwell International Corporation, El Segundo, Calif.

[21] Appl. No.: 615,752

[22] Filed: Nov. 19, 1990

[51] Int. Cl.[5] .............................................. G01C 9/14
[52] U.S. Cl. ......................................... 33/397; 33/366
[58] Field of Search ................ 33/346, 344, 366, 391, 33/396, 397

[56] References Cited

U.S. PATENT DOCUMENTS

| | | | |
|---|---|---|---|
| 2,096,638 | 10/1937 | Higgins | 33/391 |
| 2,384,586 | 9/1945 | Allgeo | 33/397 |
| 3,409,993 | 11/1965 | Hansen . | |
| 3,618,399 | 11/1971 | Aske . | |
| 3,985,033 | 10/1976 | Ford . | |
| 4,265,027 | 5/1981 | Burniski . | |
| 4,365,421 | 12/1982 | Byrum . | |
| 4,422,243 | 12/1983 | Brunson et al. . | |
| 4,791,730 | 12/1988 | Gill . | |
| 4,812,654 | 3/1989 | Araujo . | |
| 4,888,540 | 12/1989 | Terpstra et al. . | |
| 4,903,531 | 2/1990 | LeBlond et al. . | |

FOREIGN PATENT DOCUMENTS 1024720 6/1983 U.S.S.R. ............................... 33/397

Primary Examiner—Harry N. Haroian
Attorney, Agent, or Firm—H. Frederick Hamann; George A. Montanye; Tom Streeter

[57] ABSTRACT

A self-erecting tiltmeter includes a vertical seeking assembly suspended on a gimbals within a housing which contains a viscous fluid. Portions of the assembly outer surface spherically match corresponding portions the housing inner surface, leaving a gap or gaps across which the fluid may transfer tilts to the vertical seeking assembly. Different portions may have different radii or curvature. The fluid is sufficiently dense as to reduce the weight of the assembly on the gimbals. The vertical seeking assembly includes a conductivity difference bubble sensor assembly, signals from which are transmitted to the exterior of the housing through wires which pass through the pivots of the gimbals. An annulus of closed cell neoprene accommodates thermal expansion of the fluid.

20 Claims, 1 Drawing Sheet

SELF-ERECTING TILTMETER

BACKGROUND OF THE INVENTION

The present invention relates to tiltmeters, and has particular relation to tiltmeters which are self-errecting.

A tiltmeter is a high technology version of a carpenter's level. Like a carpenter's level, it measures how far the meter has tilted by the position of a bubble in a fluid against a curved upper surface. Unlike a carpenter's level, it measures it by comparing the conductance of the fluid (which is very sensitive to the position of the bubble) between a centrally located anode on the bottom of the meter and two cathodes on opposite sides of the top of the meter. Since the relative conductances can be measured with great accuracy, the amount of tilt can be measured with corresponding accuracy.

In some applications, it is important to know how far from vertical the apparatus to which the tiltmeter is attached has leaned. In this case, the meter must be precisely aligned with the appropriate axis of the apparatus, and the apparatus must, in turn, be precisely aligned in a vertical direction. In other situations, to which the present invention is directed, it is not necessary for the tiltmeter to measure the absolute angle made between the apparatus and the vertical. In these situations, the tiltmeter need only measure changes in the angle, having a certain minimum angular velocity. For example, when measuring the strength of an earthquake, it is important to know not only how far the earth slipped, but also how much it tilted and how quickly it returned to normal as the shock wave passed through it. This may be a much more important factor to consider, when designing a road or parking lot, than how much the road or parking lot moved as a unit. At the same time, it is not important that the road or parking lot be absolutely level to within a few seconds of arc. It is important to know only how much it was twisted during the earthquake. In such cases, it is an advantage for the tiltmeter to be able to be set onto, or built into, the road in an only roughly vertical orientation, and, in a reasonable time, get quite close to true vertical.

SUMMARY OF THE INVENTION

The present invention therefore mounts a tiltmeter so that it seeks true vertical over a fairly long period (more than half an hour), regardless of the orientation of the apparatus to which it is attached. However, it does this in such a fashion that short term (on the order of one second) rotations of the meter are accurately detected, even at minute amplitudes. It does this by placing the tiltmeter into a cylinder with spherically rounded ends, the top end of which is filled with air, dry nitrogen, or some similar diffuse material, and the bottom end of which is filled with metal or similar dense material. The cylinder is floated in a viscous fluid, with a density as high as possible and suspended on a pair of conventional gimbals. The high density reduces the weight on the gimbals, and thus reduces friction.

The shafts of the gimbals are hollow, so that wires from the tiltmeter may pass through them while exerting the minimum torque possible. The shafts bear on jeweled bearings, again to reduce the rotational resistance to a minimum. Since there is extremely little friction, the tiltmeter will point extremely close to vertical within a reasonable time, on the order of a half hour. At the same time, the container for the viscous fluid is shaped so that the top and bottom inside surfaces are also spherical, and closely approach the spherical end surfaces of the cylinder. The extremely small gap between these two surfaces, coupled with the extremely viscous nature of the fluid, allow rotational vibrations in the region of interest (around 1 Hz) to be accurately transmitted from the earth to the tiltmeter proper. Of these two factors, high viscosity is more important than small gap. An adequate (although less sensitive) device can be made even without rounded ends, if necessary. If the vibrations are of sufficiently small amplitude, they will not throw the tiltmeter out of its range of operation, which is, typically, a half or a third of one degree in any direction, and the tiltmeter will begin to operate at the edge of this range for sufficiently small vibrations.

The container is also in the form of a cylinder, and is sealed to prevent leakage of the fluid. Since the fluid generally has a much larger coefficient of thermal expansion than the metal from which the container is made, the invention can be somewhat improved by placing a closed cell foam rubber doughnut in the corners of the cylindrical container, that is, where the side surface meets the end surfaces. As the fluid expands, the air trapped in the closed cells contracts, and vice versa. The pressure on the viscous fluid is therefore strictly determined by the temperature, and pressure dependent terms in the damping function can be included within the temperature dependent terms.

DETAILED DESCRIPTION OF A PREFERRED EMBODIMENT

Figure 1:
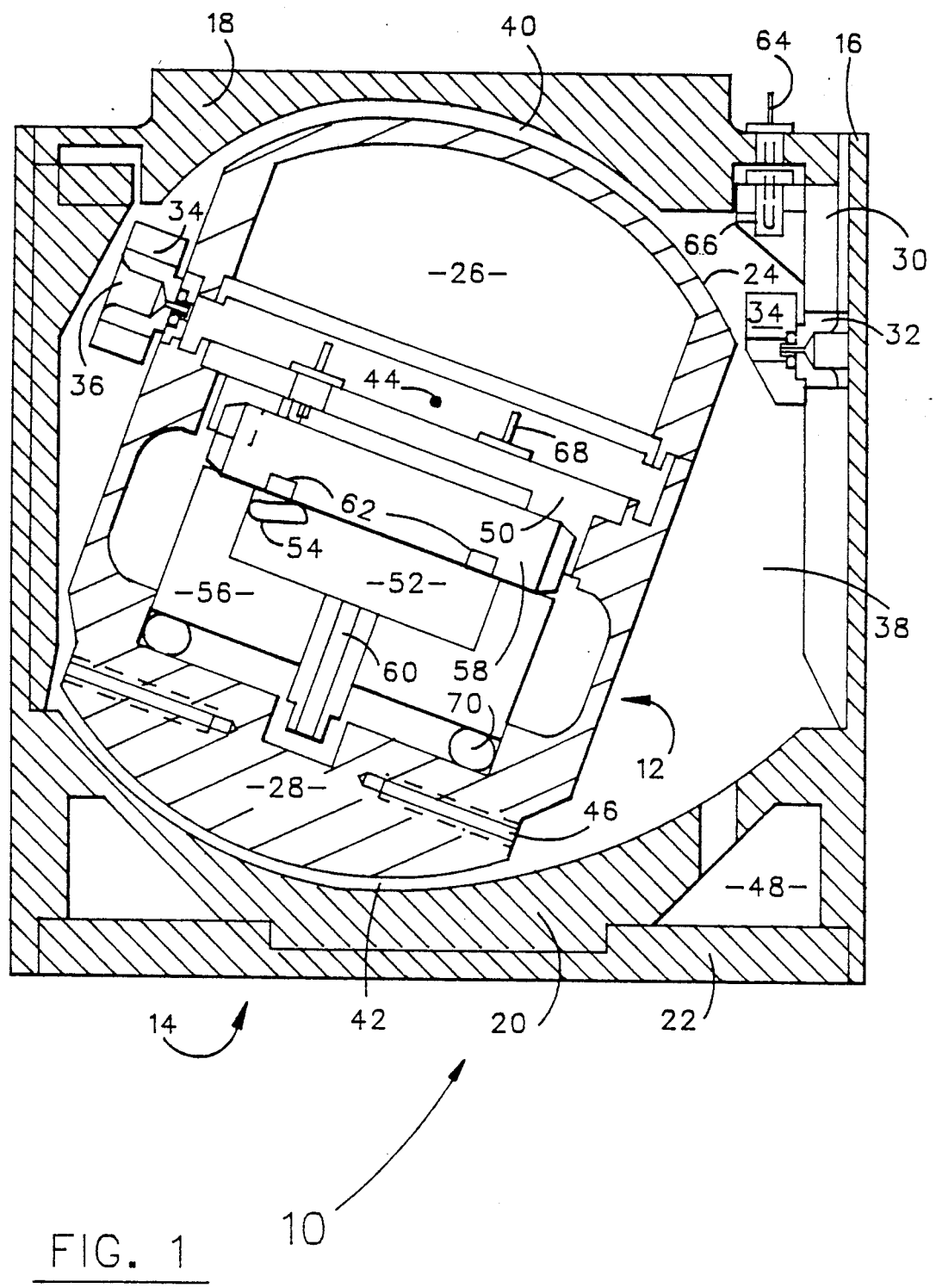
FIG. 1 is a vertical cross-sectional view of the present invention.

FIG. 1 shows a vertical cross section of the tiltmeter 10. The tiltmeter 10 comprises a vertical seeking assembly 12 and a housing 14. The housing 14 comprises a cylindrical case 16, a top cover 18, a bottom cover 20, and a base 22. The vertical seeking assembly 12 comprises a top cap 24 which surrounds an air chamber 26. The air chamber 26 may be filled with air, nitrogen, helium, or any other lightweight material, or may even be evacuated if the top cap 24 is sufficiently strong. The bottom cap 28 is at the opposite end of the vertical seeking assembly from the top cap 24, and is made of metal or some other dense material. Applicants prefer not to use ferrous metals or other magnetic materials, in order to avoid the earth's magnetic field.

The vertical seeking assembly 12 is supported by means of an outer gimbal ring 30 which supports an outer jewel and pivot 32. The outer jewel and pivot 32 in turn supports an inner gimbal ring 34, which supports an inner jewel and pivot 36. The vertical seeking assembly 12 is supported on the inner jewel and pivot 36. Although the inner jewel and pivot 36 is shown on the opposite side of the outer jewel and pivot 32 for clarity, in actuality it would be located 90° from the outer jewel and pivot 32 rather than 180° from the outer jewel and pivot 32. Further, while only a single outer jewel and pivot 32, and only a single inner jewel and pivot 36 are shown, again for purposes of clarity, in actuality each of these jewels and pivots would have a counterpart on the opposite side of the vertical seeking assembly 12. The vertical seeking assembly 12 seeks vertical because the air chamber 26 has a smaller torque than the bottom cap 28. Gravity therefore pulls the bottom cap 28 downward, and forces the top cap 24 upward.

The vertical seeking assembly 12 rotates in a fluid cavity 38. The fluid cavity 38 contains a fluid which is both dense and viscous. It is dense so that its density may approximate the density of the vertical seeking assembly 12 as a whole, as closely as possible. This reduces the weight on the jewels and pivots 32 and 36, and thereby allows them to rotate more freely. The fluid in the fluid cavity 38 is also viscous, so that, as it penetrates the top gap 40 between the top cover 18 and the top cap 24, and as it penetrates the bottom gap 42 between the bottom cap 28 and the bottom cover 20, any short term rotation imposed on the housing 14 will be transmitted to the vertical seeking assembly 12.

The vertical seeking assembly 12 rotates about a center of rotation 44 which is well above its center of volume and even further above its center of gravity. The torque impressed by the weight of the bottom cap 28 is therefore magnified by the longest possible lever arm. As a result of this extremely high placement, the radius of curvature of the top gap 40 is considerably smaller than the radius of curvature of the bottom gap 42. During factory calibration, one or more balance screws 46 may be placed in the bottom cap 28 so that the axis of the vertical seeking assembly will be vertical when the housing 14 is vertical. Applicants prefer to use four balance screws 46, but, in principle, as few as two would be sufficient.

The fluid in the fluid chamber 38 will generally expand with an increase in temperature but generally has a very low compressability. A fluid expansion chamber 48, in the form of annulus, is therefore provided to accomodate the excess volume caused by an increase in temperature. The fluid expansion chamber 48 should be filled with a readily compressible material which does not interact with the fluid in the fluid cavity 38, and which cannot escape into the fluid cavity 38 and thus perhaps contaminate the top gap 40 and bottom gap 42. Applicants prefer to fill the fluid expansion chamber 48 with an annulus of closed-cell neoprene.

The interior of the vertical seeking assembly 12 includes a bubble sensor assembly 50. The bubble sensor assembly 50 includes a bubble cavity 52, which contains a somewhat conductive fluid and a bubble 54. The bubble cavity 52 is bounded below by a bubble base 56 and above by a bubble cap 58. The bubble base 56 includes a cathode 60, which passes current through the bubble cavity 52 to a plurality of anodes in the bubble cap 58. Since the bubble 54 has a conductivity different from that of the fluid in the remainder of the bubble cavity 52, a difference in the amount of current passing through oppositely disposed anodes 62 can be detected, the position of the bubble 54 precisely deduced, in the angle of tilt deduced from this position. Although only two anodes 62 are shown for purpose of clarity, Applicants prefer to use four anodes 62 in orthogonal pairs, although in principle three anodes are sufficient.

Signals pass to and from the tiltmeter 10 through a plurality of terminals 64. The terminals 64 are connected to wires 66 which pass through the center of the jewel and pivots 32 and 36 (to minimize torque imposed by the wires 66), thence through feed throughs 68 and finally to the cathode 60 and anodes 62. The bubble sensor assembly 50 may be conveniently supported on the bottom cap 28 by an O ring 70.

The foregoing structure allows easy removal and replacement of the vertical seeking assembly 12 without interfering with the housing 14, and likewise allows easy removal and replacement of the bubble sensor assembly 50 without interfering with the remainder of the vertical seeking assembly 12.

Operation is apparent from the foregoing description of structure. Long term (more than approximately one half hour) variations in tilt are ignored, since the vertical seeking assembly 12 will slowly rotate to a true vertical position, even though the housing 14 has not been precisely leveled. After this relatively brief shake down period, the vertical seeking assembly 12 will be closely coupled through the gaps 40 and 42 to the housing 14, such that short duration (approximately one second or less) changes in the tilt of the housing 14 will be accurately reflected in the tilt of the vertical seeking assembly 12. This tilt from the vertical of the vertical seeking assembly 12 can be accurately measured by the bubble sensor assembly 50.

INDUSTRIAL APPLICABILITY

The present invention is capable of exploitation in industry, and can be used, whenever it is desired to measure short term tilts, the measurement of long term tilts is not crucial, and the avoidance of erecting the tiltmeter to true vertical as part of the initialization process. It can be made from components, each of which (considered apart from the others) is entirely conventional; or it can be made from the non-conventional versions of such components.

While a particular embodiment of the present invention has been described in detail, the true scope and spirit of the present invention is not limited thereto, but is limited only by the following claims.

What is claimed is:

1. A self-erecting tiltmeter comprising:
   (a) a housing defining a fluid cavity;
   (b) a vertical seeking assembly supported on a gimbal within the fluid cavity;
   (c) a viscous fluid in the fluid cavity, providing a fluid coupling between the housing and the vertical seeking assembly; and
   (d) means mounted on the vertical seeking assembly, for measuring the angle of tilt between the vertical seeking assembly and the vertical direction.

2. The tiltmeter of claim 1 wherein the fluid is sufficiently dense as to provide substantial support to the vertical seeking assembly.

3. The tiltmeter of claim 1 wherein the gimbal comprises two axes.

4. The tiltmeter of claim 1 wherein the housing and the vertical seeking assembly define a first gap having a first radius of curvature from a center of rotation of the gimbal.

5. The tiltmeter of claim 4 wherein the housing and the vertical seeking assembly further define a second gap having a second radius of curvature from the center of rotation of the gimbal.

6. The tiltmeter of claim 5 wherein the first radius of curvature differs from the second radius of curvature.

7. The tiltmeter of claim 1 further comprising means for accommodating excess volume produced by expansion of the fluid.

8. The tiltmeter of claim 7 wherein the accommodating means comprises a volume of compressible material.

9. The tiltmeter of claim 1 wherein the tilt measuring means comprises a conductivity difference bubble sensor assembly.

10. The tiltmeter of claim 9 further comprising at least one wire from the bubble sensor assembly to the housing through at least one pivot in the gimbal.

11. A method for measuring short term tilts, comprising:
   (a) applying a short term tilt to a housing defining a fluid cavity;
   (b) coupling the tilt from the housing across a viscous fluid in the fluid cavity to a vertical seeking assembly supported on a gimbal within the fluid cavity; and
   (c) measuring the tilt of the vertical seeking assembly, by a tilt measuring means mounted on the vertical seeking assembly.

12. The method of claim 11 wherein the fluid is sufficiently dense as to provide substantial support to the vertical seeking assembly.

13. The method of claim 11 wherein the gimbal comprises two axes.

14. The method of claim 11 wherein the housing and the vertical seeking assembly define a first gap having a first radius of curvature from a center of rotation of the gimbal.

15. The method of claim 14 wherein the housing and the vertical seeking assembly further define a second gap having a second radius of curvature from the center of rotation of the gimbal.

16. The method of claim 15 wherein the first radius of curvature differs from the second radius of curvature.

17. The method of claim 11 further comprising means for accommodating excess volume produced by expansion of the fluid.

18. The method of claim 17 wherein the accommodating means comprises a volume of compressible material.

19. The method of claim 11 wherein the tilt measuring means comprises a conductivity difference bubble sensor assembly.

20. The method of claim 19 further comprising the step of transmitting a signal through at least one wire from the bubble sensor assembly to the housing, the wire passing through at least one pivot in the gimbal.

* * * * *